Figure 1:
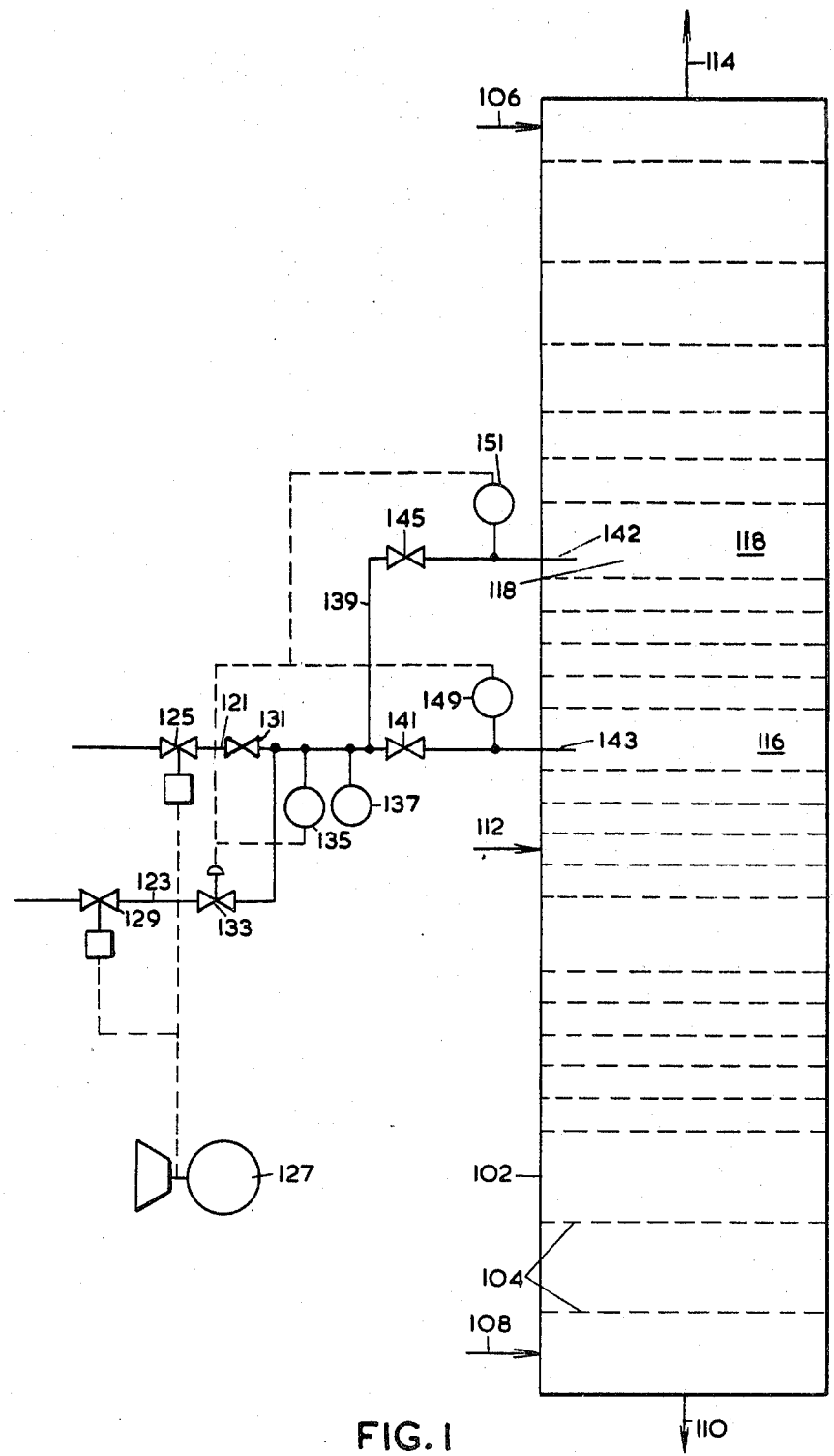

United States Patent [19]

Blakey et al.

[11] 4,235,858

[45] Nov. 25, 1980

[54] PROCESSES FOR PRODUCING NITRIC ACID BY UTILIZATION OF COLD OXYGEN

[75] Inventors: Philip G. Blakey, Riddings; Bryan K. Smith, Woking; Richard W. Watson, Allestree, all of England

[73] Assignee: BOC Limited, London, England

[21] Appl. No.: 27,694

[22] Filed: Apr. 6, 1979

[30] Foreign Application Priority Data

Apr. 7, 1978 [GB] United Kingdom ............... 13818/78

[51] Int. Cl.³ ............................................. C01B 21/40
[52] U.S. Cl. .................................................... 423/393
[58] Field of Search ............... 423/235, 392, 393, 394; 55/68

[56] References Cited

U.S. PATENT DOCUMENTS 2,088,057   7/1937   Handforth ........................... 423/393

FOREIGN PATENT DOCUMENTS

| 131510 | 8/1946 | Australia | 423/400 |
| 1539288 | 8/1968 | France | 423/400 |
| 121635 | 12/1918 | United Kingdom | 423/393 |
| 290679 | 5/1928 | United Kingdom | 423/392 |
| 758417 | 10/1956 | United Kingdom | 423/393 |
| 910131 | 11/1962 | United Kingdom | 423/392 |

OTHER PUBLICATIONS

Webb, H. W., *Absorption of Nitrous Gases,* Longmans Green & Co., N. Y., 1923, pp. 14–25 & 94–98.

*Primary Examiner*—G. O. Peters
*Attorney, Agent, or Firm*—David L. Rae; Larry R. Cassett; Edmund W. Bopp

[57] ABSTRACT

In a process for producing nitric acid, a mixture of oxygen, nitrogen, nitric oxide, nitrogen dioxide, and dinitrogen tetroxide is introduced into an absorption column into which cold oxygen (below 0° C.) is introduced. $H_2O$ is introduced into the upper reaches of the column and reacts with the nitrogen dioxide and dinitrogen tetroxide to form nitric acid. The low oxygen temperature helps to shift the equilibrium between nitric oxide and oxygen to dinitrogen tetroxide and in favor of reacting the latter with water to form nitric acid.

12 Claims, 2 Drawing Figures

PROCESSES FOR PRODUCING NITRIC ACID BY UTILIZATION OF COLD OXYGEN

This invention relates to a gas-liquid contact process and in particular to such a process for making nitric acid.

One conventional process for making nitric acid includes the steps of oxidising ammonia to nitric oxide and water vapour by reaction with air in a catalytic burner or reactor (the catalyst typically being platinum/rhodium) at a temperature in the order of 900° C. The reaction products from the burner are cooled to a temperature at which most of the water vapour condenses. Reaction between the water and the nitric oxide results in the condensate being a dilute solution of nitric acid.

The undissolved gases (typically containing 10% by weight of nitric oxide, most of the balance being nitrogen and oxygen) are passed into the bottom section of at least one absorption column or other gas/liquid contact device in which the ascending gases are contacted with a descending flow of water. The dilute nitric acid from the condenser is introduced into the or each column at an intermediate level.

The nitric oxide reacts with the air in the column to form dinitrogen tetroxide which is in equilibrium with its monomer nitrogen dioxide). The dinitrogen tetroxide reacts in turn with water to form nitric acid. These reactions can be represented as follows:

$$NO + O_2 = 2NO_2. \quad (I)$$

$$NO_2 + H_2O = HNO_3 + NO. \quad (II)$$

Accordingly, as the water descends the or each column or contact device, it becomes richer in nitric acid. The product leaving the bottom of the column is typically an aqueous solution containing 50 to 70% by weight of nitric acid. Often, this product tends to be discoloured owing to the presence of unoxidised nitric oxide in it. The nitric acid is, therefore, passed into the top of at least one so-called "bleaching tower", in which it is contacted by an ascending stream of air effective to remove the discolouration. The gas leaving the top of the or each "bleaching tower" is typically returned to the or each absorption column. If desired, one or more columns which perform both the "absorption" and "bleaching" functions may be employed.

It is known that by adding (pure) oxygen or oxygen-enriched air into an absorption column or other gas-liquid contact device, at least 80% or the the oxygen or oxygen-enriched air being added to the column of device at one or more locations where from 70 to 90% by volume of the nitric oxide in the gas entering the bottom of the column of device has reacted with oxygen already present in the gas mixture entering the bottom of the column or other device. Our copending application Ser. No. 915,861, filed June 15, 1978, now U.S. Pat. No. 4,183,906 provides a further improvement whereby (pure) oxygen or oxygen-enriched air is introduced both into an absorption column and bleaching tower. Introduction of oxygen or oxygen-enriched air at both locations makes possible the attainment of advantages in terms of plant uprating, reductions in the level of NOx emissions, or increases in the concentration of the acid produced greater than that which might be achieved merely by adding the oxygen or oxygen-enriched air to the absorption column or to the bleaching tower. As well as employing commercially pure oxygen in an absorption column or bleaching tower, it is additionally or alternatively possible to add it to a gas mixture produced by the catalytic oxidation of ammonia. This may be done before, during or after the cooling in a heat exchanger or condenser of such gas mixture containing the products of the catalytic oxidation of ammonia.

We now believe that a further improvement can be obtained in the processes according to each of the aforesaid co-pending applications by using cold oxygen or cold oxygen-enriched air. We believe that the use of cold oxygen in such processes favours the formation of dinitrogen tetroxide and nitric acid. In addition, the addition of oxygen, irrespective of its temperature, favours the formation of dinitric tetroxide.

According to the present invention there is provided a gas-liquid contact process for making nitric acid, which process includes conducting a reaction between nitric oxide and oxygen to form dinitrogen tetroxide and conducting a reaction between so-formed dinitrogen tetroxide and water to form nitric acid, wherein some of the necessary oxygen is supplied from a source of commercial oxygen (as hereinafter defined) or gas mixture containing at least 40% by volume of oxygen to one or more chosen regions where one or both of the aforesaid reactions take place, the commercial oxygen or gas mixture containing at least 40% by volume of oxygen being at a temperature of below 0° C. as it comes into contact or heat exchange relationship with reactants in the or each said reaction region.

By the term "commercial oxygen" as used herein is meant substantially pure oxygen or a gas mixture containing at least 90% by volume of oxygen. It is to be appreciated that substantially pure oxygen is readily available commercially from cryogenic air separation processes. If substantially pure oxygen is not employed, oxygen-enriched air may be employed instead, but, preferably, the concentration of nitrogen in such oxygen-enriched air is as low as possible.

The commercial oxygen or gas mixture containing at least 40% by volume of oxygen is preferably at a temperature of below $-20°$ C. as it comes into contact or heat exchange relationship with reactants in the or each said reaction region. Preferably its temperature is below $-100°$ C. Preferably, liquid commercial oxygen is brought into contact or heat exchange relationship with the reactants in the or each said reaction region.

The or each chosen reaction region may be within one or more absorption columns in which the aforesaid reactions take place. Alternatively, though or less preferably, the commercial oxygen or gas mixture containing at least 40% by volume of oxygen may be introduced into the reaction products of the catalytic oxidation of ammonia immediately downstream of the reactor in which such catalytic conversion takes place, or, in, or downstream of one or more heat exchangers or condensers in which the reaction products are cooled.

Preferably, the chosen reaction region or at least one of the chosen reaction regions is situated at a location in an absorption column, where, in operation of the column, the absorption reaction is from 70 to 90% (preferably 70 to 80%) complete.

Although it is possible to use other forms of gas-liquid contact devices, preferably trays are provided in the or each absorption column for contact of descending nitric acid with ascending gases.

In such an absorption column the oxygen or gas mixture containing at least 40% by volume of of oxygen is preferably introduced into the gaseous phase rather than the liquid phase. In a typical absorption column of conventional design, there will be groups of vertically spaced-apart horizontally-disposed trays.

Between groups of such trays a relatively large space will generally be left, this space being referred to hereinafter and in the art as an "oxidation space".

Preferably, the commercial oxygen or gas containing at least 40% by volume of oxygen is introduced into one of these "oxidation spaces". Alternatively, such oxygen can be introduced into the gas space above any tray in any chosen group of trays. A less preferred alternative is to pass the cold commercial oxygen or gas mixture containing at least 40% by volume of oxygen through heat exchange tubes or coils located just above one or more trays in the column.

It is preferred to contact the cold oxygen or gas mixture containing at least 40% by volume of oxygen with the nitric oxide in an oxidation space so as to facilitate conversion of nitric oxide to dinitrogen tetroxide. Moreover, introduction of the cold commercial oxygen or gas mixture containing at least 40% by volume of oxygen into an oxidation space (rather than into the liquid in the column) facilitates control of the introduction so as to avoid local freezing of the nitric acid being formed in the column. In addition, introducing the commercial oxygen into the oxidation space facilitates its mixing with the gases ascending the column and thereby helps to equalise the temperature of such gases. Preferably, means are provided for monitoring the temperature of the chosen reaction region so as to avoid local freezing of water or nitric acid. If desired, the temperature monitoring means may be associated with a valve or valves controlling the flow of cold commercial oxygen or gas mixture containing at least 40% by volume of oxygen into the or each chosen region, the arrangement being such that the flow rate or rates is or are adjusted automatically so as to keep the monitored temperature within a chosen temperature range. While observing the limitation that local freezing of nitric acid should desirably be avoided, the temperature of the or each reaction region is preferably reduced to a temperature close to but above the freezing point the nitric acid solution that occurs in the said region. In a conventional absorption column producing product acid containing 69% by weight of nitric acid, the freezing point of the acid falls from 0° C. at the top of the column where water is introduced to about −35° C. at the bottom from which the product acid is taken.

Preferably, the cold commercial oxygen or gas mixture containing at least 40% by volume of oxygen is introduced into the or each reaction region through a vacuum-insulated nozzle. If commercial oxygen is to be introduced in its liquid state, the nozzle may be adapted to form a spray of the liquid oxygen.

The or each adsorption column may be operated at any convenient pressure. For example, the operating pressure may be in the range of 1 to 15 bar.

In general, it may be desirable to introduce the cold commercial oxygen or cold gas mixture containing at least 40% by volume of oxygen into just a single reaction region within an adsorption column. However, to introduce all the required cold commercial oxygen or gas mixture containing at least 40% by volume of oxygen at a single location may cause a reduction in temperature there sufficiently large to give rise to local freezing of nitric acid. In such instances, the cold commercial oxygen or cold gas mixture containing at least 40% by volume of oxygen is desirably introduced into 2 separate reaction regions within the column.

The cold commercial oxygen maybe provided in its gaseous state by evaporating liquid oxygen or by mixing gaseous oxygen at approximately ambient temperature with liquid oxygen. Alternatively, depending on the pressure at which the commercial oxygen is available, it may be reduced in temperature from ambient temperature by passing it through an expansion turbine, a Joule-Thomson valve or restricting valve.

Rather than producing cold commercial oxygen by mixing liquid oxygen with gaseous oxygen, at ambient temperature the two may be introduced separately into the or each chosen reaction region. Typically, the oxygen at ambient temperature will be introduced into the region directly above the liquid commercial oxygen.

Figure 2:
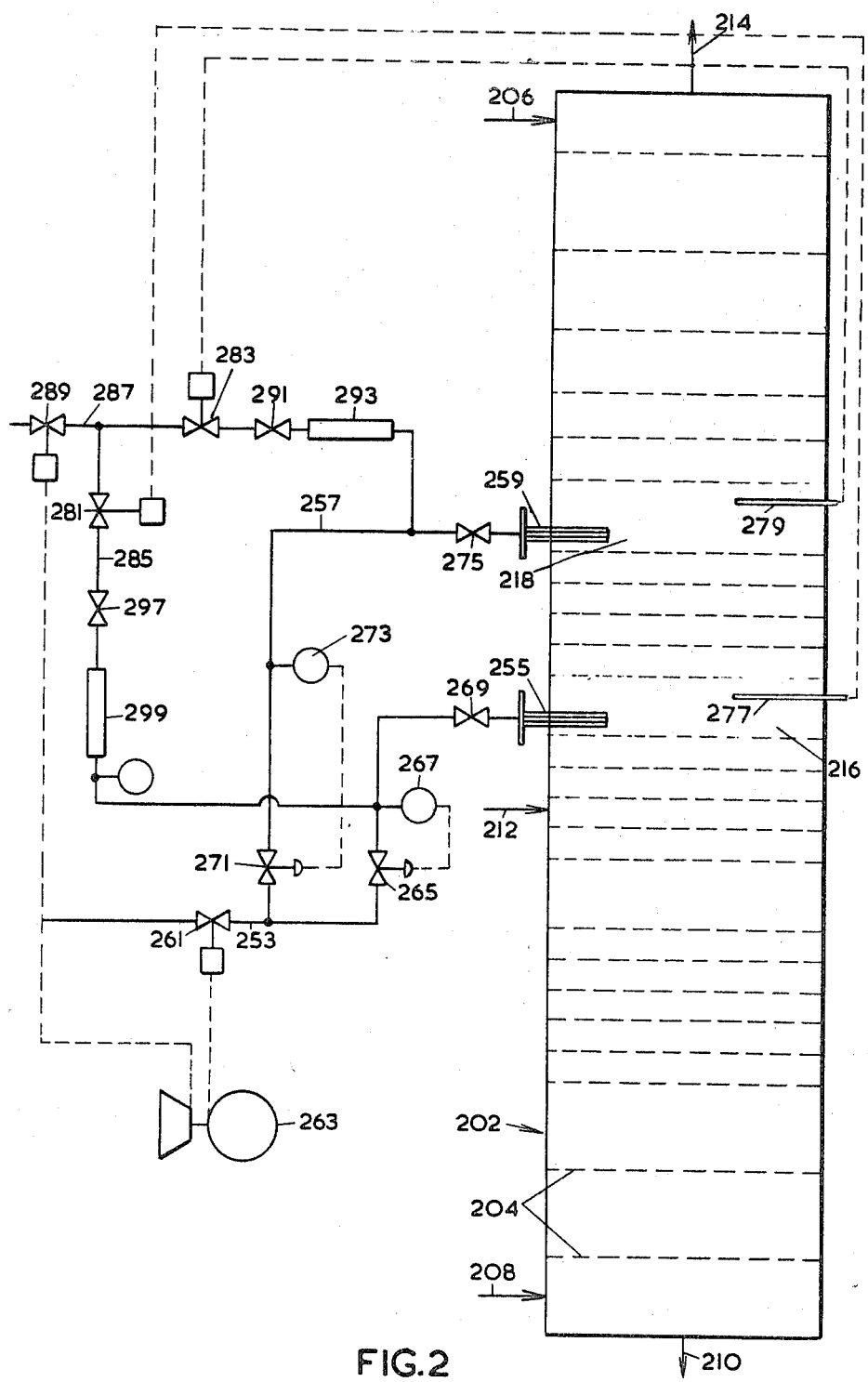

The process according to the invention will now be further described by way of example with reference to the accompanying drawings, of which:

FIG. 1 is a schematic diagram representing part of the plant adapted to produce nitric acid by the process according to the invention; and FIG. 2 is a schematic diagram representing part of an alternative plant for producing nitric acid by the process according to the present invention.

Referring to FIG. 1 of the drawings, a plant for producing nitric acid includes an absorption column 102. The absorption column contains 24 vertically spaced apart and horizontally disposed sieve trays 104. Above the uppermost tray in the column 102 there is an inlet 106 for water. Below the lower most tray in the column, there is an inlet 108 for gas mixture containing nitrogen, oxygen, nitric oxide, nitrogen dioxide and its dimer dinitrogen tetroxide and water vapour. In operation of the column the water descends the column from tray to tray and encounters the gas mixture ascending the column through the perforations in the sieve trays. Dinitrogen tetroxide is formed by the reaction between nitric oxide and oxygen. The resultant dinitrogen tetroxide together with that in the gas mixture entering the column through the inlet 108 reacts with the water to form nitric acid. Thus, as the water descends from tray to tray it becomes progressively richer in nitric acid until at the bottom it may contain up to 69% by weight of nitric acid.

There is an outlet 110 for nitric acid at the bottom of the column below the lower most tray. In addition, just above the 10th tray from the bottom of the column 102 there is an inlet 112 for dilute nitric acid which is formed by pre-cooling the gas mixture that enters the column through the inlet 108. This precooling is performed after the gas mixture is formed by catalytic oxidation of ammonia.

It will be appreciated that in operation of the column 102 as the gas ascends the column so it becomes progressively leaner in oxides of nitrogen until, at the top of the column, substantially all the oxides of nitrogen have been absorbed. There is at the top of the column in communication with the gas space above the uppermost tray, an outlet 114 in communication with the gas space above the uppermost tray in the column 102, through which outlet 114 the gas mixture after having passed through all the trays can leave the column. These trays from the 3rd to the 18th (from the bottom) are spaced such that relatively larger gas spaces (oxidation spaces) are left between the 8th and 9th trays from the bottom, the 13th and 14th trays from the bottom and the 18th and 19th trays from the bottom than are left between other pairs of adjacent trays between the 3rd and 18th trays from the bottom of the column.

The space between the 13th and 14th trays is indicated by the reference numeral 116 and the space between the 18th and 19th trays is indicated by the reference numeral 118. In the gas spaces above each tray and particularly in the oxidation spaces reaction between the nitric oxide and oxygen takes place. It is to be appreciated that nitric oxide is regenerated as a result of the reaction between water and dinitrogen tetroxide to form nitric acid.

The absorption column shown in FIG. 1 is also provided with means for introducing cold commercial oxygen into the gas spaces 116 to 118. These means are described below.

Referring to FIG. 1, a pipeline 121 for gaseous oxygen and a pipeline 123 for liquid oxygen are provided. In the pipeline 121 is disposed a shut off valve 125 which is an automatic valve operatively associated with a compressor 127 which is used to increase the pressure of the gas mixture upstream of the absorption column or to compress incoming air before it is passed into the catalytic reactor (not shown) in which the gas mixture (which is pre-cooled and then passed into the absorption column 102 through the inlet 108) is formed. Downstream of the valve 125 is a stop valve 131. Downstream of the valve 131 the pipeline 123 terminates in the pipeline 121.

The pipeline 123 has a shut off valve 129 which is an automatic valve operatively associated with the compressor 127 in the same way as the valve 125. Downstream of the valve 129 in the pipeline 123 is a flow control valve 133. This is typically a motorised valve. The operation of the valve 133 is primarily controlled by a temperature indicator cum controller 135 which senses the temperature of the cold oxygen passing through the pipeline 121 at a region downstream of the union of that pipeline with the pipeline 123. The controller may be set so as to adjust automatically the setting of the valve 133 to keep the sensed temperature within each chosen preset limits. Typically, the temperature of the cold oxygen can be kept within + or $-2°$ C. of the chosen temperature.

Downstream of the temperature indicator cum controller 135 a flow meter 137 communicates with a pipeline 121. Thus, an indication of the total flow of oxygen into the absorption column may be given. Downstream of the flow meter 137, a pipeline 139 branches off from the pipeline 121. In the pipeline 121, downstream of the union of the pipeline 121 and 139 is a shut off valve 141. Downstream of the shut off valve 141 the pipeline 121 enters the absorption column 102 and terminates in a nozzle 143 located in the gas space 116.

In the pipeline 139 is a shut off valve 145. Downstream of the shut off valve 145 the pipeline 139 enters the absorption column 102 and terminates in a nozzle 147 situated in the gas space 118.

The pipelines 121, 123 and 139 are typically vacuum-insulated. In addition, all external surfaces of the nozzles 143 and 147 are vacuum-insulated. This is so as to prevent or keep down deposition of frozen water vapour on the nozzles 143 and 147.

Intermediate the valve 141 and the nozzle 143 is another temperature indicator cum controller 149. In addition, intermediate of the flow control valve 145 and the nozzle 147 is a temperature indicator cum controller 151. The function of the temperature indicator cum controllers 149 and 151 will be described below.

In operation, gaseous oxygen at approximately ambient temperature is passed through the pipeline 121 and liquid oxygen is passed through the pipeline 123. Both the gaseous oxygen and the liquid oxygen are substantially pure containing less than 0.1% by volume of impurity. The liquid oxygen mixes with the gaseous oxygen and thus evaporates, thereby reducing the temperature of the oxygen. The temperature of the cold oxygen is kept within chosen limits by operation of the temperature indicator cum controller 135. The total flow of oxygen is recorded by the flow meter 137. The valves 141 and 145 are set so that the maximum possible amount of oxygen is injected into the gas space 116 through the nozzle 143 without incurring any risk of freezing of the nitric acid formed in the column. In order to avoid such risk, the valve 145 may have to be kept open so that some cold oxygen is injected into the gas space 118 through the nozzle 147.

The temperature indicator cum controllers are provided so as to ensure that the temperature of the cold oxygen injected into the absorption column through the nozzles 143 and 147 respectively is not such as to cause a risk of local freezing of nitric acid in the column. Accordingly, the controllers are set so as to over-ride the indicator cum controller 135 should both the temperatures sensed downstream of the valves 141 and 145 fall below chosen preset values. When either sensed temperature is outside the chosen minimum or maximum value for it the respective temperature controller takes over control of the setting of the valve 133 to produce the desired increase or decrease in the flow rate of liquid oxygen through the pipeline 123.

The cold oxygen entering the gas spaces 116 and 118 from the nozzles 143 and 147 respectively helps to shift the equilibrium between on the one hand nitric oxide and oxygen and on the other hand dinitrogen tetroxide in the direction as the concentration of oxygen in the gaseous phase is increased by virtue of this addition of oxygen. It is to be appreciated that introduction of the cold oxygen into the gas spaces 116 and 118 assists mixing of the oxygen with the other gases ascending through the column 102. The cold oxygen also helps to reduce the temperature of the nitric acid. Such reduction in temperature shifts the equilibrium between on the one hand, dinitrogen tetroxide and water and on the other hand, nitric acid and nitric oxide in the direction favouring formation of nitric acid.

Referring now to FIG. 2, reference numerals that are even integers are used to indicate parts that are identical with parts shown in FIG. 1. Thus, for example, the absorption column in FIG. 1 is indicated by the reference numeral 102 and in FIG. 2 by the reference numeral 202, and the outlet for nitric acid is indicated in FIG. 1 by the reference numeral 110 and in FIG. 2 by the reference numeral 210, and so on.

It will thus be appreciated that operation of the absorption column 202 is substantially the same as the operation of the absorption column 102 shown in FIG. 1. The difference between the two plants is the way in which the cold commercial oxygen is supplied.

In the plant shown in FIG. 2, liquid oxygen (more than 99.9% pure) is introduced into the column 202 in its liquid state. The use of liquid oxygen makes possible a greater temperature reduction in the column that can be achieved merely by the use of gaseous oxygen because additional heat is extracted from the contents of the column in vaporising the oxygen.

The liquid oxygen is supplied from a source (not shown) to a vacuum-insulated pipeline 253. The pipeline 253 terminates in a spray nozzle 255 extending into the gas space 216. All the external surfaces of the spray nozzle 255 are vacuum insulated. Communicating with the pipeline 253 is a vacuum insulated pipeline 257 which terminates in a spray nozzle 259 projecting through a wall of the column 202 into the gas space 218. The spray nozzle 259 has its external surfaces vacuum-insulated.

In the pipeline 253 upstream of the union of the pipeline with pipeline 257 is a shut-off valve 261 which is operatively associated with a pump 263 used to feed liquid ammonia to a catalytic reactor in which it is reacted with ammonia to form gas mixture entering the column through the inlet 208. The association of the valve 261 which a compressor 263 is such that when the compressor and hence the whole plant is shut down, the valve 261 is automatically closed.

In communication with the pipeline 253 downstream of the flow control valve 265 is a flow meter 267. Downstream of the flow meter 267, a manually operable shut off valve 269 is disposed in the pipeline 253.

In the pipeline 257 is disposed a flow control valve 271. Downstream of the flow control valve 271 is a flow meter 273. In turn, downstream of the flow meter 273 is a manually operable shut off valve 275. The flow control valves 265 and 271 are operable so as to proportion the liquid oxygen between the nozzles 255 and 259. In operation, the valve 265 would typically be set so as to provide the maximum possible flow of oxygen through the nozzle 255 consistent with freezing of nitric acid in the column being avoided.

In order to ensure that excessively low temperatures are not created within the absorption column 202, temperature sensors 277 and 279 are located in the gas spaces 216 and 218 respectively. The temperature sensors 277 and 279 are operatively associated with automatic flow control valves 281 and 283 in gaseous oxygen (of a purity greater than 99.9% by volume) supply pipelines 285 and 287 respectively. The pipeline 287 communicates with a source of gaseous oxygen, the source not being shown. In the pipeline 287 upstream of its union with pipeline 285 is an automatic shut-offvalve 289 which is operatively associated with the compressor 263 in the same way as the valve 261. Thus, whenever operation of the compressor 263 is stopped, the valve 289 closes. In the pipeline 287 downstream of the valve 283 is a manually operable flow control valve 291. Downstream of the flow control valve 291 is a flow rate measuring device 293 which may be used to indicate if any adjustment of the valve 291 is required to provide a chosen flow rate of oxygen therethrough. In the pipeline 285 downstream of the valve 281 is a manually operable flow control valve 297. Downstream of the flow control valve 297 is a flow rate measuring device 299 which may be used to indicate if any adjustment of the valve 297 is required to give a chosen flow rate of oxygen through the pipeline 281. The pipeline 287 terminates in the pipeline 257 at a position intermediate of valves 271 and 275. The pipeline 285 terminates in the pipeline 253 in a position downstream of the flow meter 267 and upstream of the valve 269.

In operation, the temperature sensor 277 controls operation of the valve 281, and hence controls the injection of gaseous oxygen into the pipeline 253, and the temperature sensor 279 controls operation of the valve 283, and hence controls introduction of gaseous oxygen into the pipeline 257. Typically, the temperature sensor 277 and 279 are thermocouples. The arrangement is that should the temperature sensed by the temperature sensor 277 fall below a chosen minimum the valve 281 will be opened automatically and thus relatively warm gaseous oxygen will be introduced into liquid oxygen flowing through the pipeline 253, thereby increasing the temperature of the oxygen sprayed into the gas space 216 through the nozzle 255. As a consequence, the temperature in the gas space rises. When this temperature has risen above a chosen maximum, as sensed by the temperature sensor 277, the valve 281 will be automatically closed. The association of the temperature sensor 279 with the valve 283 is analogous to the association of the sensor 277 with the valve 281. When the temperature as sensed by the sensor 279 has fallen below a chosen minimum the valve 283 will open automatically thereby allowing gaseous oxygen at or close to ambient temperature to flow into the pipeline 257 and mix with the liquid oxygen passing therethrough. This increases the temperature of the oxygen being injected into the gas space 218 to the nozzle 259. Accordingly, the temperature in the gas space 218 rises. When the temperature rises above a chosen maximum, as sensed by the temperature sensor 279, the valve 283 will close automatically, thereby stopping the flow of gas oxygen into the liquid oxygen pipeline 257.

Introduction of gaseous oxygen into the pipeline 253 or pipeline 275 will occur only if the rate of introducing water through the inlet 206 into the column 202 or the rate of introducing the gases into the column 202 through the inlet 208 falls, or control of the conventional cooling coils (not shown) on the trays fails.

The general effect of introducing liquid oxygen into the gas spaces 216 and 218 is the same as that produced by injecting cold oxygen gas into the gas spaces 116 and 118 of the absorption column 102 described with reference to FIG. 1.

The process according to the invention is further illustrated by the following example.

EXAMPLE

The gas mixture containing nitric oxide and oxygen is introduced into the column 202 through the inlet 208. The gas mixture has the following composition:

| Constituent | % by Volume |
| --- | --- |
| NO | 2.8 |
| $NO_2/N_2O_4$ | 5.8 |
| $O_2$ | 5.7 |
| $H_2O$ | 0.6 |
| $N_2$ | 85 |

In calculating the percentage by volume of nitrogen dioxide/dinitrogen tetroxide, it is assumed that all the gas is present as nitrogen dioxide.

The gas mixture ascends the column and comes into contact with dilute nitric acid descending the respective sieve trays in the column, the dilute nitric acid being formed by reaction of dinitrogen tetroxide and nitrogen dioxide with water introduced into the column through the inlet 206.

Liquid oxygen is introduced into the gas space 216 at a rate such that the temperature in the gas space is reduced by approximately 5° C. Moreover, the rate of introduction of liquid oxygen is such that the oxygen concentration in the gas mixture in the gas space 216 is increased such that the concentration of oxygen in the gas vented from the outlet 214 is increased to 5.2% by volume, it being appreciated that the concentration of oxygen will fall as the gas mixture passes through the trays below the gas space 216. Indeed, by the time the gas mixture reaches the gas space 216 almost 90% of the total heat generated in the column by the reactions would have been dissipated.

By injecting liquid oxygen into the gas space 216 through the nozzle 255 a resulting reduction in $NO_x$ concentration in the vent gas of about 45% is achieved. In addition, the oxidation ratio of the moles of nitric oxide to the sum of the number of moles of nitric oxide and nitrogen dioxide/dinitrogen tetroxide in the gas space 216 is reduced by about 10%.

We claim:

1. A gas-liquid contact process for making nitric acid comprising the steps of conducting a first reaction between nitric oxide and oxygen in a gas mixture to form nitrogen dioxide/dinitrogen tetroxide and a second reaction between the so-formed nitrogen dioxide/dinitrogen tetroxide and water to form nitric acid, the improvement comprising supplying oxygen separately from oxygen in said gas mixture to one or more chosen reaction regions wherein one or both of the aforesaid reactions takes place, with said supplied oxygen being at a temperature of below about $-20°$ C. as said supplied oxygen comes into contact with reactants in the or each said reaction region thereby promoting said first and second reactions.

2. A process as claimed in claim 1, in which said supplied oxygen is a gas mixture containing at least 40% by volume of oxygen.

3. A process as claimed in claim 2 in which said supplied oxygen gas mixture is at a temperature of below about $-100°$ C. as said gas mixture comes into contact with reactants in the or each said reaction region.

4. A process as claimed in claim 1 in which supplied oxygen is liquid oxygen which is brought into contact with the reactants in the or each said reaction region.

5. A process as claimed in claim 1 in which the or each chosen reaction region is within one or more absorption columns in which said first and second reactions take place.

6. A process as claimed in claim 5, in which a chosen reaction region is situated at a location in an absorption column where the absorption reaction is from 70 to 90% complete.

7. A process as claimed in claim 6, in which said supplied oxygen is a gas mixture containing at least 40% by volume of oxygen and is introduced into one or more oxidation spaces in the absorption column(s).

8. A process as claimed in claim 5 additionally comprising the steps of sensing the temperature in the or each chosen reaction region and controlling the flow of supplied oxygen to said chosen region or regions in response to said sensed temperature to maintain temperatures therein above the temperatures at which local freezing of nitric acid or water in the or each reaction region is avoided.

9. A process for producing nitric acid in an absorption column having a plurality of vertically spaced apart trays including the step of introducing nitric oxide, oxygen and water into said column; the improvement comprising the step of introducing said oxygen at a temperature of about $-20°$ C. or less into said column by passing oxygen gas at a temperature above about $0°$ C. into a conduit; injecting a flow of liquid oxygen into said conduit to thereby vaporize said liquid oxygen and form a combined oxygen gas flow at said temperature of $-20°$ C. or less; introducing said combined oxygen gas flow into a space in said column between two of said trays; sensing the temperature of said combined oxygen gas flow in said conduit; and controlling the flow of said liquid oxygen to said conduit in response to said sensed temperature to maintain the temperature of said combined oxygen gas flow at about $-20°$ C. or less without causing local freezing of water in said column.

10. The method defined in claim 9 wherein the oxygen gas passed to said conduit is at approximately ambient temperature.

11. A process for producing nitric acid in an absorption column having a plurality of vertically spaced apart trays including the step of introducing nitric oxide, oxygen and water into said column, the improvement comprising the step of introducing said oxygen at a temperature of about $-20°$ C. or less by passing a flow of liquid oxygen through a conduit; adding a flow of oxygen gas to said liquid oxygen flow in said conduit; passing the resulting liquid-gaseous oxygen mixture from said conduit into a space between two trays in said column, said mixture havig a temperature of about $-20°$ C. or less; sensing the temperature in said space; and controlling the flow of gaseous oxygen into said conduit in response to said sensed temperature to maintain a predetermined temperature in said space without causing local freezing of water in said column.

12. A process for producing nitric acid in an absorption column having a plurality of vertically spaced apart trays including the step of introducing nitric oxide, oxygen and water into said column, the improvement comprising the steps of introducing oxygen in the liquid state into said column by passing a flow of liquid oxygen through a conduit into a gas space between two of said trays in said column; introducing a flow of relatively warm oxygen gas into the liquid oxygen in said conduit; sensing the temperature in said gas space; and controlling the flow of relatively warm gaseous oxygen introduced into said liquid oxygen in response to the sensed temperature whereby the temperature in said column is prevented from falling below a level at which local freezing of water occurs.

* * * * *